(12) United States Patent
Sakata et al.

(10) Patent No.: US 6,206,378 B1
(45) Date of Patent: Mar. 27, 2001

(54) GAS TURBINE SPINDLE BOLT SEAL DEVICE

(75) Inventors: Kaoru Sakata; Takeshi Nakamura, both of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/186,381

(22) Filed: Nov. 5, 1998

(30) Foreign Application Priority Data

Dec. 8, 1997 (JP) .................................................. 9-337119

(51) Int. Cl.[7] .................................................. F16J 15/447
(52) U.S. Cl. .............................................. 277/411; 277/421
(58) Field of Search .................................. 277/411, 421; 415/115; 416/96 R

(56) References Cited

U.S. PATENT DOCUMENTS

| | | |
|---|---|---|
| 3,597,024 * | 8/1971 | Singelmann . |
| 4,194,745 | 3/1980 | McDougal . |
| 5,037,115 | 8/1991 | Brandon . |
| 5,303,936 * | 4/1994 | Kuroki . |
| 5,433,453 | 7/1995 | Dalton . |
| 5,628,617 | 5/1997 | Dalton et al. . |
| 5,794,942 * | 8/1998 | Vance et al. . |
| 5,951,250 * | 9/1999 | Suenaga et al. . |
| 6,019,573 * | 2/2000 | Uematsu et al. . |
| 6,053,701 * | 4/2000 | Ichiryu et al. . |

FOREIGN PATENT DOCUMENTS 1 309 350    3/1973   (GB) .

OTHER PUBLICATIONS

Patent Abstracts of Japan, 09133005, May 20, 1997.

* cited by examiner

*Primary Examiner*—B. Dayoan
*Assistant Examiner*—John L. Beres
(74) *Attorney, Agent, or Firm*—Wenderoth, Lind & Ponack, L.L.P.

(57) ABSTRACT

A sealing device in a gas turbine that uses steam for cooling high temperature portions of the gas turbine and then recovers the steam. The sealing device prevents the steam from leaking at a spindle bolt portion of the turbine disc (8). The spindle bolt (1) passes through a seal hole (4) formed in the turbine disc (8). The sealing device is disposed in the seal hole and includes a seal piece (3), having a smaller coefficient of linear expansion relative to the spindle bolt (1), and a seal piece cover (5) for covering the seal piece (3). A pressure hole is bored through the seal piece cover (5) such that high pressure side steam pressure is introduced through the pressure hole (6) and into an inner side of the seal piece cover (5) so that the seal piece (3) is urged into contact with a sheet surface (7) of the seal hole (4).

4 Claims, 4 Drawing Sheets

GAS TURBINE SPINDLE BOLT SEAL DEVICE

BACKGROUND OF THE INVENTION

1. Field of the Invention The present invention relates to a spindle bolt seal device for a gas turbine, which is constructed such that steam is used for cooling a gas turbine high temperature portions and is then recovered.

2. Description of the Prior Art A gas turbine, operating under high temperature conditions, is being developed with a recovery type steam cooled system in which steam is used for cooling of high temperature portions and, after used for the cooling, the steam is recovered.

In the recovery type steam cooled system, the steam that has been used for cooling and then recovered, is effectively used for performing another work, and thus preventing the steam from leaking uselessly before it is recovered leads to enhancement of the cycle efficiency. Moreover, if the steam for cooling mixes into a gas path of the gas turbine, there is a fear of lowering the performance of the gas turbine itself.

On the other hand, first to fourth stage discs and end rotors of the gas turbine are fastened so as to be connected to each other by a spindle bolt and an outlined structure thereof is shown in FIG. 7. In FIG. 7, numeral 01 designates a first stage disc, which carries a first stage moving blade 04, numeral 02 designates a second stage disc, which carries a second stage moving blade 05 and numeral 03 designates a third stage disc, which carries a third stage moving blade 06.

Numeral 1 designates a spindle bolt, which passes through the discs 01 to 03 to connect them. Cooling steam flows into the respective moving blades from each of the discs, as shown by arrows, and is collected so as to be recovered into cavities formed between the discs.

In the prior art gas turbine, as shown in FIG. 6, no seal is provided for the spindle bolt 1, but rather there is a clearance 9 between a disc 8 and the spindle bolt 1 in a bolthole 2 so as to be appropriate for cooling of the spindle bolt 1. However, in the gas turbine which employs the recovery type steam cooled system, spaces between each of the discs 8 are filled with steam, hence there is a problem in that the steam leaks toward the upstream side through the clearance 9 between the disc 8 and the spindle bolt I to mix into the gas path.

SUMMARY OF THE INVENTION

In view of the problem with the prior art gas turbine having a recovery type steam cooled system, it is an object of the present invention to provide a gas turbine spindle bolt seal device that is able to reduce steam leakage from a turbine disc spindle bolt portion.

In order to attain said object, in a gas turbine spindle bolt seal device of the present invention, a seal hole is formed in a turbine disc portion through which a spindle bolt passes and in the seal hole, there are disposed a seal piece fitted around the spindle bolt and a seal piece cover for covering the seal piece. The seal piece is made of a material having a smaller coefficient of linear expansion than the spindle bolt.

Further, there is bored in the seal piece cover a pressure hole through which a high pressure side steam pressure is introduced into an inner side of the seal piece cover so as to urge the seal piece in the seal piece cover into contact with a sheet surface of the seal hole.

According to the gas turbine spindle bolt seal device of the present invention constructed as above, the seal piece disposed in the seal hole is urged into contact with the sheet surface of the seal hole due to the steam pressure, and thereby the steam is prevented from leaking along the sheet surface.

Also, the seal piece is made of a material having a smaller coefficient of linear expansion than the spindle bolt, and thereby the clearance between the seal piece and the spindle bolt becomes smaller in operation and the steam is prevented from leaking along the spindle bolt.

Further, in order to attain said object, the present invention provides a gas turbine spindle bolt seal device constructed such that a seal hole is formed in a turbine disc portion through which a spindle bolt passes and a seal piece is fitted around the spindle bolt in the seal hole. The seal piece is constructed by a ring portion, which is perpendicular to the spindle bolt, and a cylindrical portion, which is parallel with the spindle bolt.

According to the gas turbine spindle bolt seal device constructed as mentioned above, a terminal end of the cylindrical portion of the seal piece is urged into contact with the sheet surface of the seal hole due to a differential pressure and as the terminal end of the cylindrical portion has a narrow contact area, a strong urging force is obtained and the steam can be reliably prevented from leaking along the spindle bolt.

Also, in order to attain said object, the present invention provides a gas turbine spindle bolt seal device constructed such that a seal hole is formed in a turbine disc portion through which a spindle bolt passes and a ring-like seal piece is inserted into the seal hole. The ring-like seal piece is made of a material having a smaller coefficient of linear expansion than the spindle bolt.

In the gas turbine spindle bolt seal device constructed as above, the ring-like seal piece is urged into contact with the sheet surface of the seal hole by the steam pressure, and thereby the steam is prevented from leaking along the sheet surface of the seal hole. Also, the seal piece is made of a material having a smaller coefficient of linear expansion than the spindle bolt, and thereby the clearance between the seal piece and the spindle bolt becomes smaller in operation and the steam leakage along the spindle bolt is reduced.

In addition to the construction of the above gas turbine spindle bolt seal device, if an additional ring-like seal piece is provided in the seal hole, the additional ring-like seal piece is made of a material having a larger coefficient of linear expansion than a material of the turbine disc portion, and thus this arrangement will be preferable because the additional ring-like seal piece is expanded by heat in operation so as to make the clearance between this seal piece and the turbine disc portion smaller, and thereby a gas turbine spindle bolt seal having less steam leakage is realized.

DESCRIPTION OF THE PREFERRED EMBODIMENTS

Herebelow, a spindle bolt seal device of the present invention will be described based on the embodiments shown in FIGS. 1 to 5.

(First Embodiment)

Figure 1:
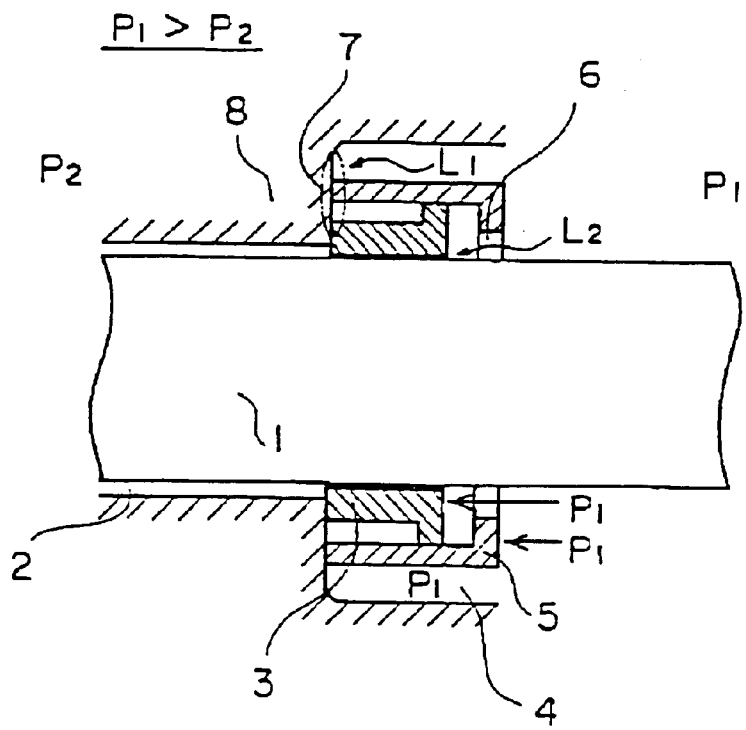
FIG. 1 is a cross sectional view showing a gas turbine spindle bolt seal device of a first embodiment according to the present invention.
Figure 2:
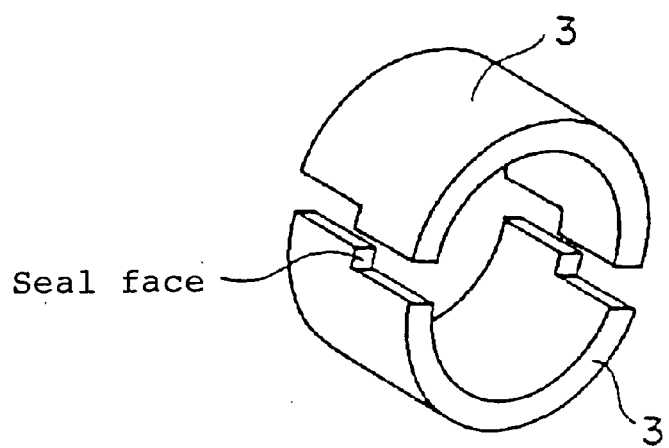
FIG. 2 is a perspective view showing a seal piece, split into two, used in the first embodiment.
Figure 7:
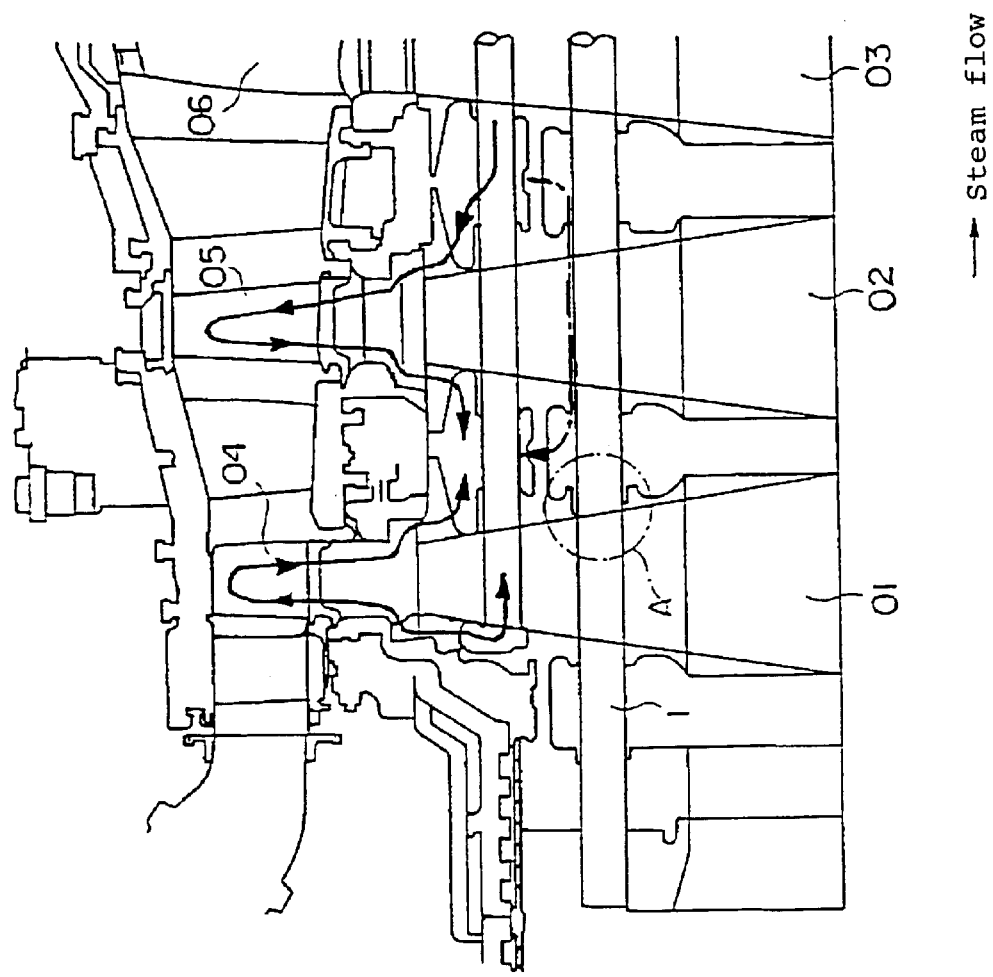
FIG. 7 is an explanatory view showing an example of a gas turbine having a recovery type steam cooled system.

A spindle bolt seal device of a first embodiment will be described with reference to FIGS. 1 and 2. FIG. 1 is an enlarged view of a portion which corresponds to portion A of FIG. 7, and in FIG. 1 numeral 4 designates a seal hole, which is formed in a disc 8 around a spindle bolt 1. A seal piece 3, split into two sections, as shown in FIG. 2 is fitted around the spindle bolt 1 in the seal hole 4. The seal piece 3 is made of a material having a smaller coefficient of linear expansion than the spindle bolt 1. The seal piece 3 has, in each of its two split surfaces, a seal face formed by a stepped portion as shown in FIG. 2 so that steam is prevented from leaking through the split portion thereof.

A cylindrical seal piece cover 5 is fitted around the seal piece 3 and a pressure hole 6 of an appropriate size and number is bored in the seal piece cover 5 along an axial direction of the spindle bolt 1 so that steam pressure $P_1$ acts on the seal piece 3 therethrough. There is a differential pressure of $P_1 > P_2$ between pressures $P_1$ on the right of the seal hole 4 in FIG. 1 and P2 on the left thereof and the seal piece 3 is urged on a sheet surface 7 of the seal hole 4 by that differential pressure.

Also, because of the differential pressure ($P_1 - P_2$) between the right and left sides of the seal hole 4, leakage $L_1$ occurs along the sheet surface 7 and leakage $L_2$ occurs along the spindle bolt 1.

Thus, the design is made such that the leakage $L_1$ is prevented by the seal piece 3 being urged into contact with the sheet surface 7 by the differential pressure ($P_1 - P_2$), and the leakage $L_2$ is prevented by a clearance between the seal piece 3 and the spindle bolt 1 being made as small as possible in operation by the material of the seal piece 3, which is selected from materials having a smaller coefficient of linear expansion than the spindle bolt 1.

By use of the construction mentioned above, the contact area of the sheet surface 7 can be made smaller, thereby surface pressure between the seal piece 3 and the sheet surface 7 is made higher. Further, a duplicate seal structure of the sheet surface 7 is formed by the seal piece cover 5 and the seal piece 3. That is, the seal piece 3 on the inner side is made of material having a smaller coefficient of linear expansion than the spindle bolt 1 so as to make the clearance between the seal piece 3 and the spindle bolt 1 smaller in operation and is urged into contact with the sheet surface 7 by the differential pressure ($P_1 - P_2$), and thereby the seal piece 3 performs its sealing function.

Also, the seal piece cover 5 on the outer side of the seal piece 3 is urged against the sheet surface 7 by the differential pressure ($P_1 - P_2$), and thereby the seal piece cover 5 effects its sealing function. That is, the seal piece cover 5 together with the seal piece 3 provides the above-mentioned duplicate seal structure of the sheet surface 7 so that the sealing effect is strengthened. With the sealing functions mentioned above, steam leakage in a rotor system can be reduced and performance enhancement of a recovery type steam cooled plant becomes possible.

(Second Embodiment)

Figure 3:
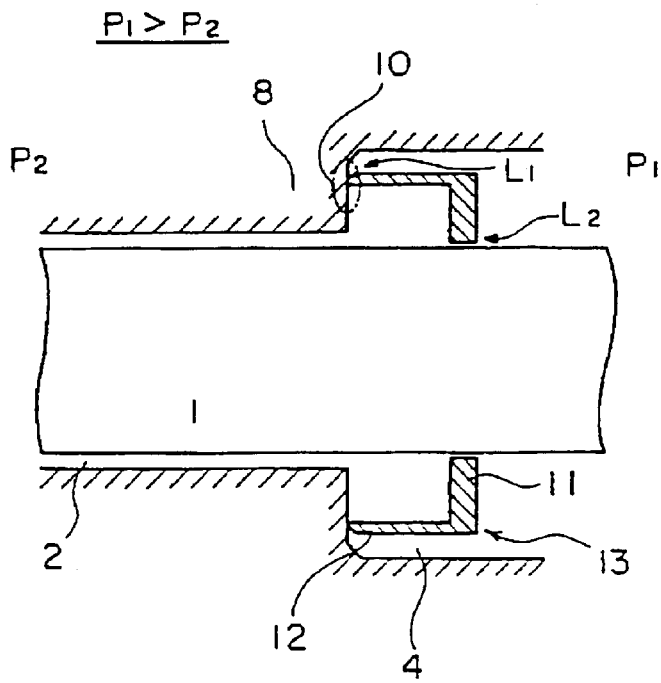
FIG. 3 is a cross sectional view showing a gas turbine spindle bolt seal device of a second embodiment according to the present invention.

Next, description will be made of a spindle bolt seal device of a second embodiment according to the present invention with reference to FIG. 3. In FIG. 3, numeral 13 designates a seal piece, which is disposed around a spindle bolt 1 in a seal hole 4.

The seal piece 13 has a ring portion 11 which is perpendicular to the spindle bolt 1 and a cylindrical portion 12 which is parallel with the spindle bolt 1. There is a differential pressure of $P_1 > P_2$ between a pressure $P_1$ on the right of the seal piece 13 in FIG. 3 and a pressure $P_2$ on the left thereof, and a leakage $L_1$ occurs along a sheet surface 10 and leakage $L_2$ occurs along the spindle bolt 1.

In the present second embodiment, the leakage $L_1$ along the sheet surface 10 is prevented by the cylindrical portion 12 of the seal piece 13 being urged against the sheet surface 10 by the differential pressure ($P_1 - P_2$). The cylindrical portion 12 of the seal piece 13 has, at its terminal end, a narrow contact area with the sheet surface 10 so that a strong urging force can be obtained.

Also, the leakage $L_2$ along an axial direction of the spindle bolt 1 is prevented by a clearance between the spindle bolt 1 and the seal piece 13 being formed so as to have a necessary minimum size in terms of assembling work.

According to the spindle bolt seal device of the second embodiment, by employing the seal piece 13 having a narrow contact area with the sheet surface 10, an ensured sealing effect can be obtained without a high degree of accuracy of surface work being required. As the result thereof, steam leakage from the spindle bolt portion can be reduced and performance enhancement of a recovery type steam cooled plant becomes possible.

(Third Embodiment)

Figure 4:
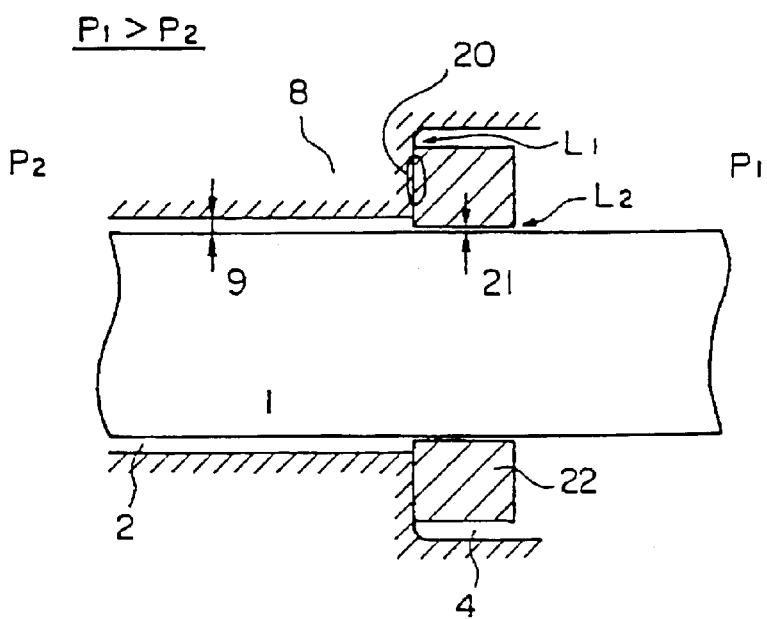
FIG. 4 is a cross sectional view showing a gas turbine spindle bolt seal device of a third embodiment according to the present invention.

Next, a spindle bolt seal device of a third embodiment according to the present invention will be described with reference to FIG. 4. In FIG. 4, numeral 22 designates a seal piece, which is disposed around a spindle bolt 1 in a seal hole 4. This seal piece 22 is made of a material having a smaller coefficient of linear expansion than the spindle bolt 1.

In the spindle bolt seal device of the third embodiment constructed as above, the seal piece 22 is urged against a sheet surface 20 by a differential pressure ($P_1 - P_2$). Also, the seal piece 22 is made of a material having a smaller coefficient of linear expansion, and thereby a clearance 21 between the spindle bolt 1 and the seal piece 22 is made smaller in operation.

Leakage $L_1$ between the seal piece 22 and the sheet surface 20 is prevented by the seal piece 22 being urged into contact with the sheet surface 20 by the differential pressure ($P_1 - P_2$) and leakage $L_2$ along the spindle bolt 1 is reduced by the seal piece 22 being made of a material having a smaller coefficient of linear expansion so as to reduce the size of the clearance 21 as small as possible.

For example, if the clearance 21 is reduced 50%, the rate of leakage there can be reduced approximately by 20%. Also, as a pressure ratio $P_1/P_2$, becomes larger, the rate of leakage there can be suppressed. This results in a reduction of steam leakage in a rotor system and performance enhancement of a recovery type steam cooled plant becomes possible.

(Fourth Embodiment)

A spindle bolt seal device of a fourth embodiment according to the present invention will be described with reference to FIG. 5. This fourth embodiment is a variation of the third embodiment and is aimed to achieve a further enhanced sealing effect with respect to the third embodiment.

Figure 5:
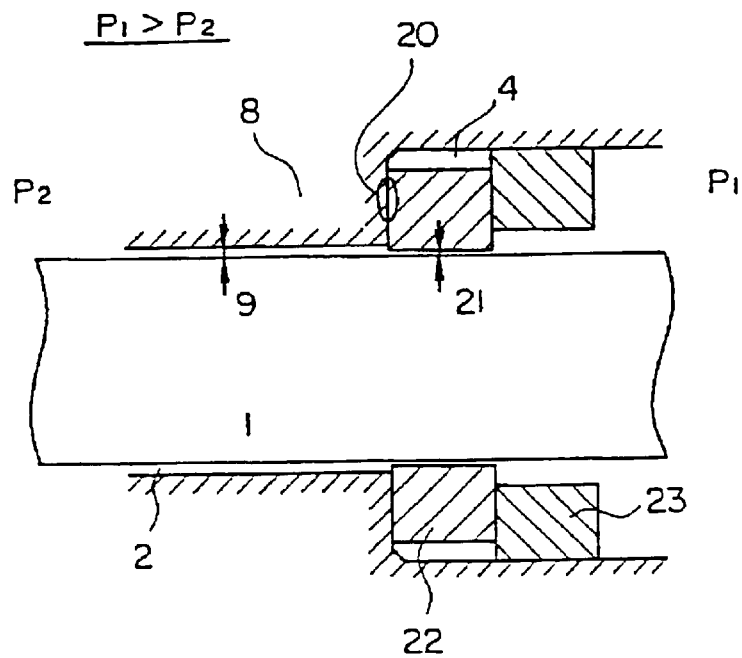
FIG. 5 is a cross sectional view showing a gas turbine spindle bolt seal device of a fourth embodiment according to the present invention.
Figure 6:
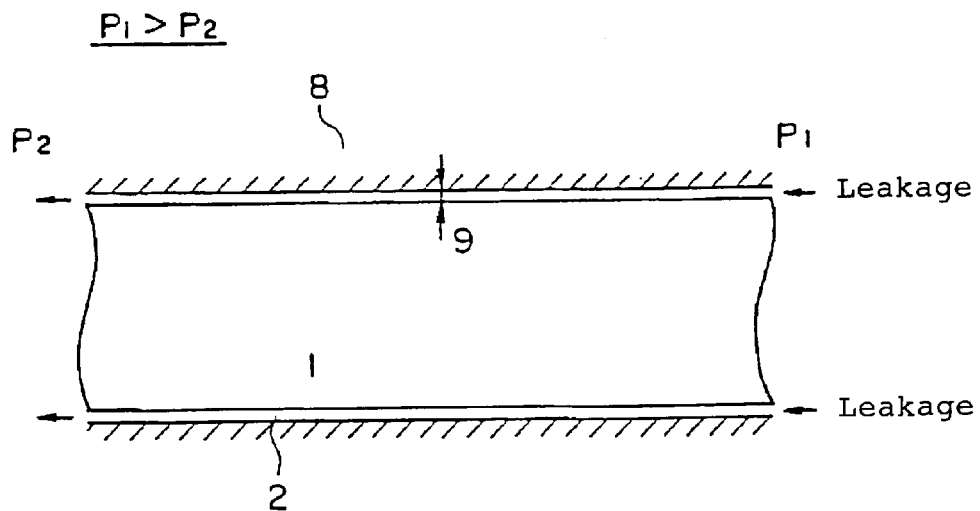
FIG. 6 is a cross sectional view showing a prior art gas turbine spindle bolt.

In FIG. 5, numeral 23 designates a seal piece, which is disposed adjacent to a seal piece 22 on an outer side thereof within a seal hole 4. The seal piece 22 is the same as that used in the spindle bolt seal device of the third embodiment.

The seal piece 23 is made of a material having a larger coefficient of linear expansion than the material forming disc 8, and thereby a clearance between the seal piece 23 expanded by heat in operation and the disc 8 becomes smaller.

Other portions of the spindle bolt seal device shown in FIG. 5 are the same as those of the third embodiment shown in FIG. 4 and functions thereof are also the same as those of the third embodiment except that the sealing effect is increased by the seal piece 23.

As described above, the present invention provides a gas turbine spindle bolt seal device in which a seal hole is formed in a turbine disc portion through which a spindle bolt passes. A seal piece is fitted around the spindle bolt in the seal hole, and the seal piece is formed of a material having a smaller coefficient of linear expansion than the spindle bolt, and a seal piece cover having a pressure hole is disposed so as to cover the seal piece in the seal hole.

According to the present spindle bolt seal device, the seal piece is urged into contact with the sheet surface of the seal hole by the differential pressure and the clearance reduction is effected by the thermal expansion difference, and thus the steam is prevented from leaking in the spindle bolt portion.

Also, the present invention provides a gas turbine spindle bolt seal device having a seal device constructed by a ring portion which is perpendicular to the spindle bolt and a cylindrical portion which is parallel with the spindle bolt.

According to this spindle bolt seal device, the seal piece at its terminal end surface is urged into contact with the sheet surface of the seal hole by the differential pressure so that a strong urging force is obtained at a small contact area, and thus the steam is prevented from leaking in the spindle bolt portion.

Further, the present invention provides a gas turbine spindle bolt seal device in which a ring-like seal piece is inserted into the seal hole. The ring-like seal piece is formed of a material having a smaller coefficient of linear expansion than the spindle bolt, and preferably an additional ring-like seal piece is provided in the seal hole. The additional ring-like seal piece is formed of a material having a larger coefficient of linear expansion than a material forming the turbine disc portion.

According to the spindle bolt seal device so constructed, the ring-like seal piece is urged by the differential pressure and the clearance between the ring-like seal piece and the spindle bolt and the clearance between the additional ring-like seal piece and the turbine disc portion are reduced by the thermal expansion difference during operation, and thus the steam is prevented from leaking in the spindle bolt portion.

It is understood that the invention is not limited to the particular construction and arrangement herein illustrated and described but embraces such modified forms thereof as come within the scope of the following claims.

What is claimed is:

1. A spindle bolt seal device of a gas turbine which is constructed such that discs are fastened to be connected to each other by a spindle bolt and steam is used for cooling of a high temperature portion to be then recovered, wherein a seal hole is formed in a turbine disc portion through which said spindle bolt passes, a seal piece is fitted around said spindle bolt in said seal hole, said seal piece being made of a material having a smaller coefficient of linear expansion than said spindle bolt, a seal piece cover is disposed so as to cover said seal piece in said seal hole and there is bored in said seal piece cover a pressure hole through which a high pressure side steam pressure is introduced into an inner side of said seal piece cover so as to urge said seal piece in said seal piece cover into contact with a surface of said seal hole.

2. A spindle bolt seal device of a gas turbine which is constructed such that discs are fastened to be connected to each other by a spindle bolt and steam is used for cooling of a high temperature portion to be then recovered, wherein a seal hole is formed in a turbine disc portion through which said spindle bolt passes and a seal piece is fitted around said spindle bolt in said seal hole, said seal piece being constructed by a ring portion which is perpendicular to said spindle bolt and a cylindrical portion which is parallel with said spindle bolt.

3. A spindle bolt seal device of a gas turbine which is constructed such that discs are fastened to be connected to each other by a spindle bolt and steam is used for cooling of a high temperature portion to be then recovered, wherein a seal hole is formed in a turbine disc portion through which said spindle bolt passes and a ring-like seal piece is inserted into said seal hole, said ring-like seal piece being made of a material having a smaller coefficient of linear expansion than said spindle bolt.

4. A spindle bolt seal device as claimed in claim 3, wherein an additional ring-like seal piece is provided in said seal hole, said additional ring-like seal piece being made of a material having a larger coefficient of linear expansion than a material of said turbine disc portion.

* * * * *